UNITED STATES PATENT OFFICE.

BEAU HOOKER, OF SAN DIEGO, CALIFORNIA.

COMPOUND FOR PRESERVING SHIPS' BOTTOMS, &c.

SPECIFICATION forming part of Letters Patent No. 459,751, dated September 22, 1891.

Application filed October 31, 1890. Renewed July 22, 1891. Serial No. 400,367. (No specimens.)

*To all whom it may concern:*

Be it known that I, BEAU HOOKER, a citizen of the United States, residing at San Diego, in the county of San Diego and State of California, have invented certain new and useful Improvements in Compounds for Preserving Ships' Bottoms, Pilings, &c.; and I do hereby declare the following to be a full, clear, and exact description of the invention, such as will enable others skilled in the art to which it appertains to make and use the same.

My invention consists in a new paint compound or composition paint for preserving from decay ships' bottoms, wharf-piling, and all surfaces which are exposed to the action of the water; and my invention will be hereinafter fully described and claimed.

The following description fully explains the nature of my invention and the manner of its manufacture and use.

My paint compound consists of the following ingredients, combined in the proportions and in the manner which will be now set forth. I take rosin, three pounds two ounces; whiting, two and one-half pounds; sulphate of copper, two pounds; boiled linseed-oil, one-half gallon; litharge, one-fourth pound; turpentine, one-half gallon; subacetate of copper, one-half pound; silicate of soda, (liquid,) two quarts; chloride of zinc, six ounces; arsenate of copper, one pound. These ingredients are combined together as follows: First, a half-pint (½ pint) of the linseed-oil and the rosin are placed in a suitable vessel over a fire, and when heated add, while stirring slowly, the sulphate of copper and the whiting. The stirring is continued until effervescence ceases. The remainder of the linseed-oil is then added, when the mass is allowed to cool, after which the remaining ingredients, above specified, are added to it and the whole mixed thoroughly. When the compound is required for use, it must be heated and applied while hot, and is applied with a brush, like ordinary paint.

My new composition paint or paint compound will thoroughly and effectually preserve the bottoms of ships and boats, wharf-piling, and all surfaces which are exposed to the water, and will therefore effect a vast saving, as will be readily understood.

Having thus described my invention, what I claim, and desire to secure by Letters Patent, is—

The herein-described paint compound for preserving surfaces exposed to the action of the water, the same consisting of rosin, whiting, sulphate of copper, boiled linseed-oil, litharge, turpentine, subacetate of copper, silicate of soda, (liquid,) chloride of zinc, and arsenate of copper, combined in the proportions and in the manner specified.

In testimony whereof I have affixed my signature in presence of two witnesses.

BEAU HOOKER.

Witnesses:
A. B. SMITH,
D. H. BROWN.